(No Model.) 5 Sheets—Sheet 1.

W. H. HOLLAR & A. KENNEDY.
SAFE.

No. 591,188. Patented Oct. 5, 1897.

WITNESSES: INVENTORS:

(No Model.) 5 Sheets—Sheet 2.

W. H. HOLLAR & A. KENNEDY.
SAFE.

No. 591,188. Patented Oct. 5, 1897.

WITNESSES:

INVENTORS:
W. H. Hollar and A. Kennedy (No Model.)

5 Sheets—Sheet 5.

W. H. HOLLAR & A. KENNEDY.
SAFE.

No. 591,188. Patented Oct. 5, 1897.

WITNESSES:

INVENTORS:

UNITED STATES PATENT OFFICE.

WILLIAM H. HOLLAR AND ANTHONY KENNEDY, OF PHILADELPHIA, PENNSYLVANIA; SAID KENNEDY ASSIGNOR TO SAID HOLLAR.

SAFE.

SPECIFICATION forming part of Letters Patent No. 591,188, dated October 5, 1897.

Application filed February 15, 1897. Serial No. 623,495. (No model.)

*To all whom it may concern:*

Be it known that we, WILLIAM H. HOLLAR and ANTHONY KENNEDY, of Philadelphia, in the State of Pennsylvania, have invented certain new and useful Improvements in Burglar-Proof Safes, whereof the following is a specification, reference being had to the accompanying drawings.

Figure 1:
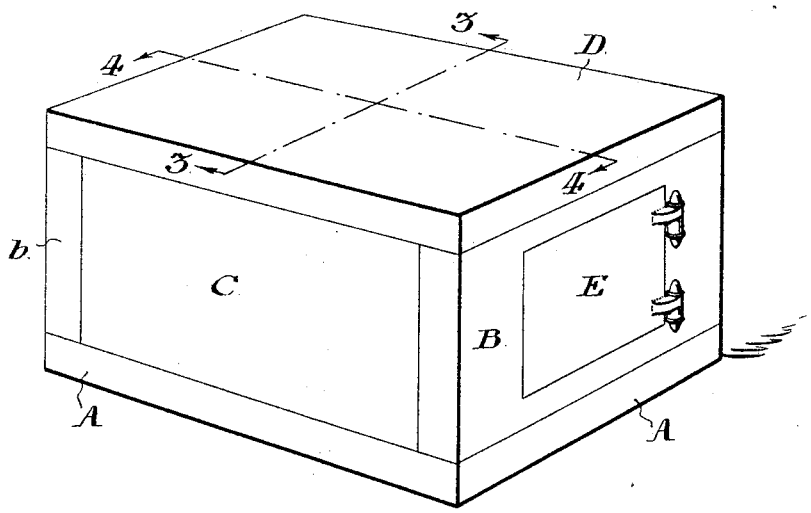
Figure 2:
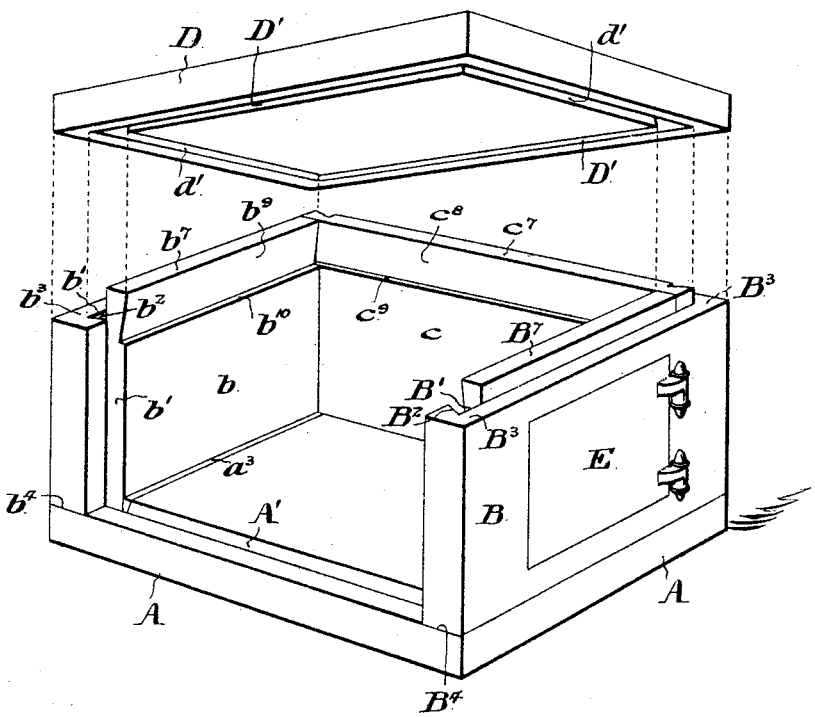
Figure 3:
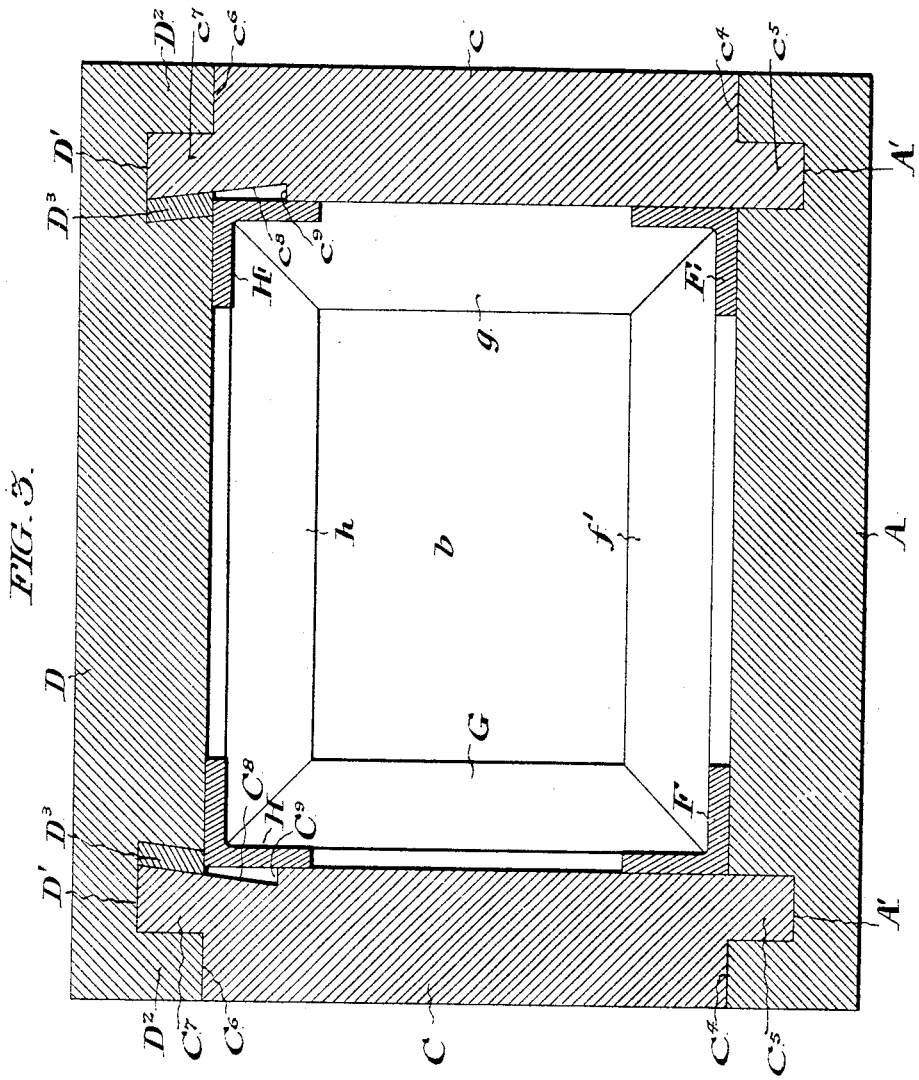
Figure 4:
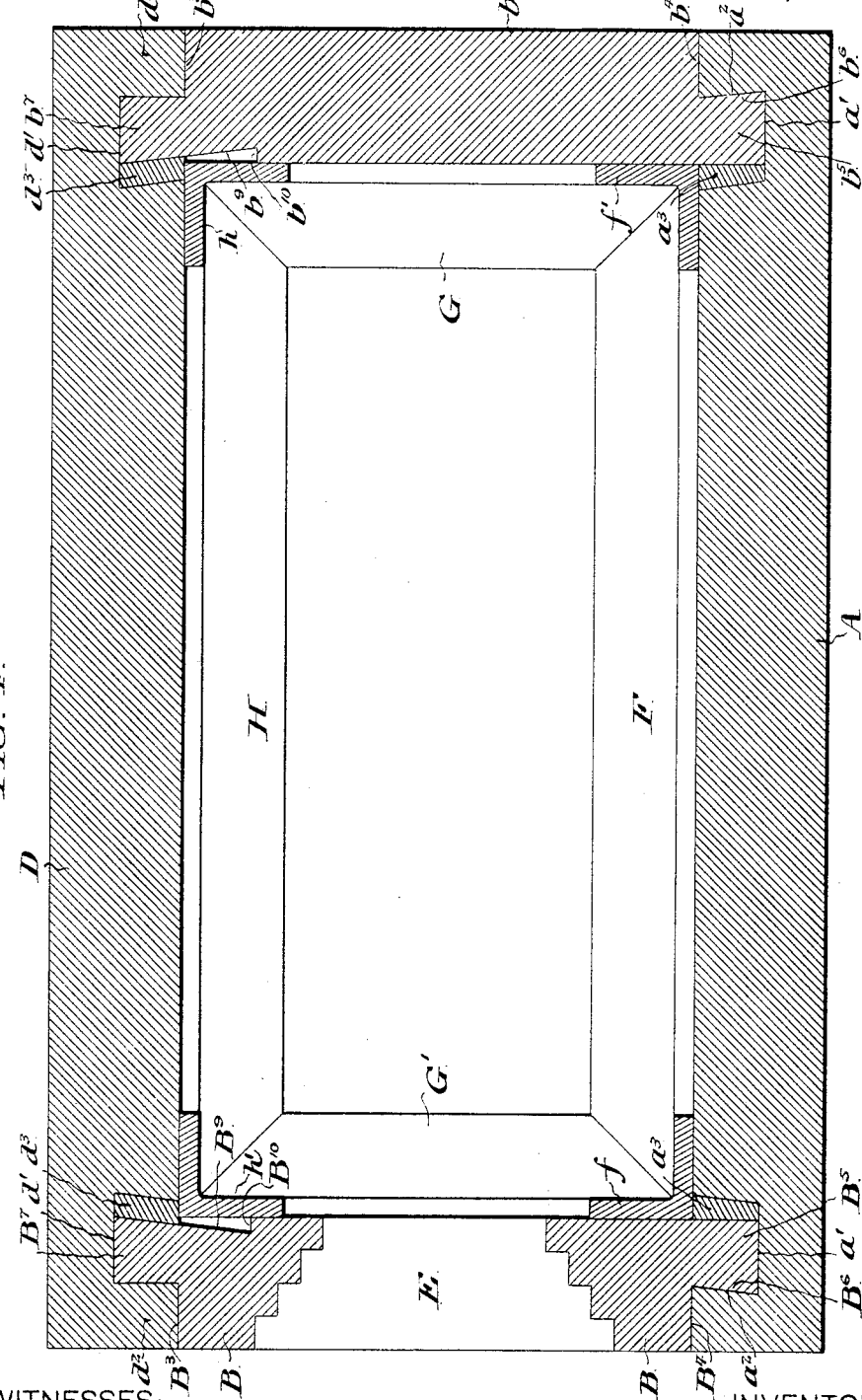
Figure 5:
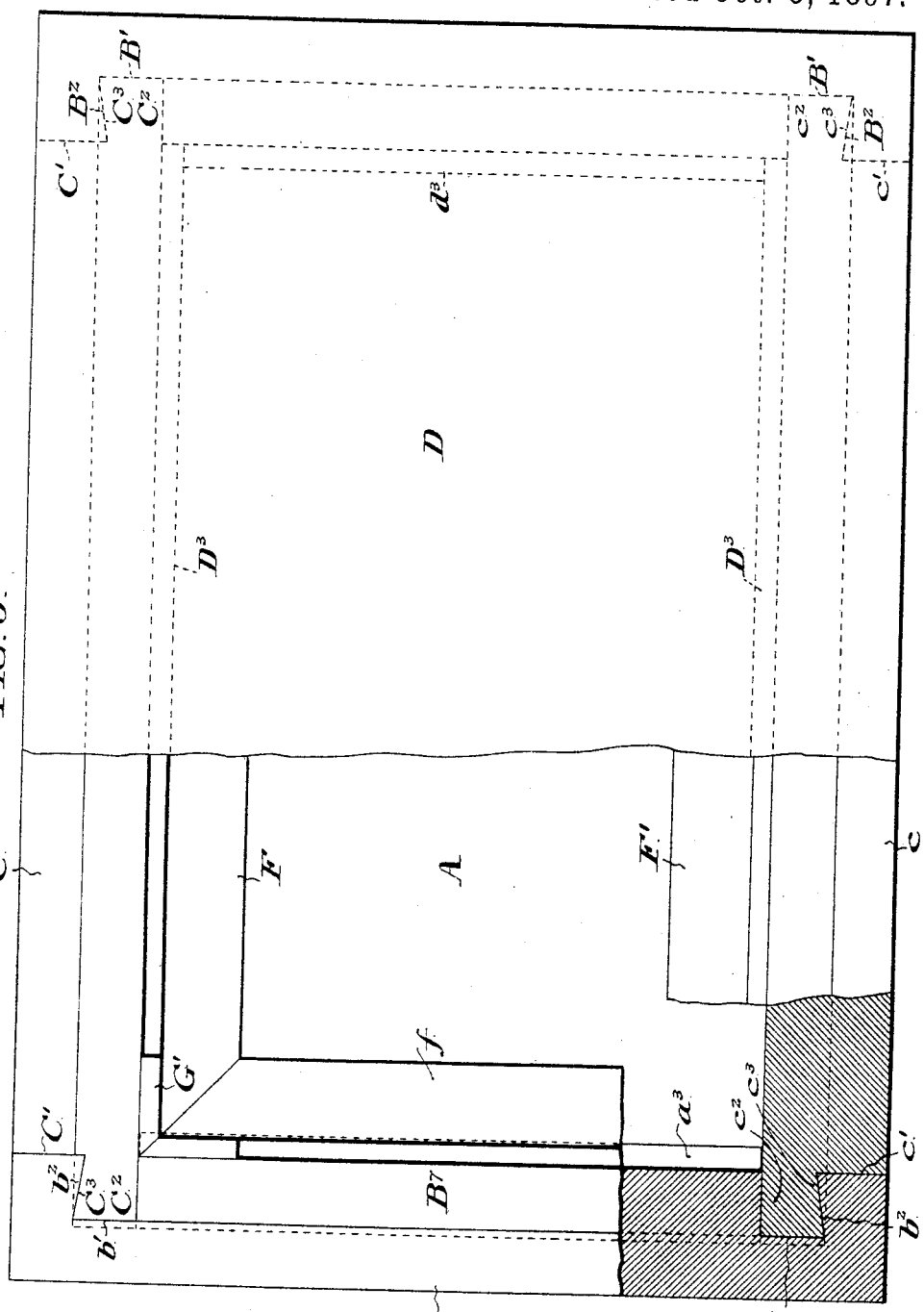
Figure 6:
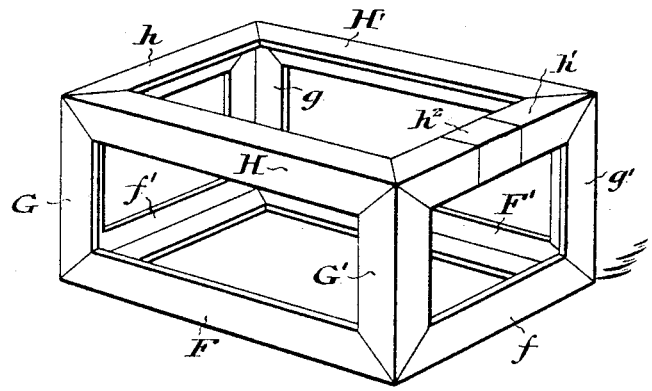
Figure 7:
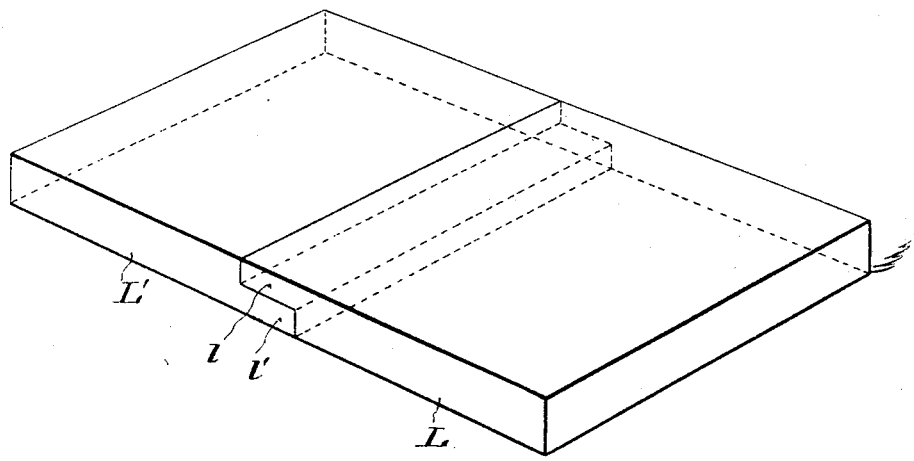

In said drawings, Figure 1 represents a perspective view of a typical safe embodying our improvements, the dimensions, of course, as well as some of the details, being arbitrary in this as well as in the other figures. Fig. 2 is a partial perspective view of such safe with one of the sides entirely removed and with the top displaced, in order to show in perspective the under side thereof. Fig. 3 is a sectional view on an enlarged scale, the plane of section being indicated by the dotted lines 3 3 in Fig. 1. Fig. 4 is a longitudinal sectional view on the same scale as Fig. 3, the plane of section being indicated by the dotted lines 4 4 of Fig. 1. Fig. 5 is a view on the same scale as Figs. 3 and 4, portions of the figure being represented as broken away, so as to show details at different levels. Fig. 6 is a detail view of the interior framing represented apart from the remaining members of the structure to which it belongs, the scale of this figure being the same as that of Fig. 1. Fig. 7 is a detail view of one of the walls, illustrating certain structural features which may be employed.

Before proceeding to describe in detail a preferred method of mechanical construction embodying our invention we would point to certain features of novelty which in one sense are irrespective of structural details.

Ordinarily, safes are built up of successive layers of steel or other similar material, each layer being in effect a structural element independent of the others and capable of removal by a successful attack upon the securing devices by which it is held in place. Under these circumstances the strength of the safe-wall is fairly represented by adding together the periods of time required for successive penetration of the several layers or elements which compose it, since these elements do not, strictly speaking, combine and produce a total result greater than or different from the arithmetical sum of their addition. A comparatively moderate time of uninterrupted attack will, practically, always suffice for the penetration of any number of such layers or elements as may be consistent with ordinary limitations of structure. Blocks of metal have also been suggested for the purpose, but under such conditions that each block was a structural element capable of individual attack or penetration or removal, as in the case of layers. The same total mass of material, if integrated, can be made to present a resisting power greatly in excess of the mere addition of the number of small units, since the element or unit of the structure can be made in itself too massive to admit of being removed as a whole within any reasonably possible limits of attack, and the penetration and removal of a part of the elements sufficient to afford access to the interior may be made alike practically impossible within such limits. For example, it is well known that a burglar can impair the hardness of a layer of steel sufficiently to penetrate it, and after removing enough of it to expose the next layer can repeat the process throughout, successive exposures being obtained with comparative facility. So, also, in the case of blocks, if the securing devices of an individual block or unit be successfully attacked it can be removed bodily and access thus obtained.

Our invention is addressed to the remedying of these objections, and in carrying out our invention we select a particular material which is peculiarly adapted to the desired purpose, the disposition of such material in substantially integral elements of massive character and the definite combination of these elements in a structure whose parts are completely interlocked and secured in position by internally-disposed locking members. If the whole side or top of a vault be composed of a massive slab of steel armor-plate, Harveyized, for example, on its external and internal surfaces, even supposing the hardness to be destroyed upon the exterior throughout a given region, (and this process is rendered more difficult by the fact that the material is disposed in an integral mass of high conducting power for heat,) penetration cannot be accomplished until the hardness of the interior portion is also destroyed, and as no extended exposure of this part can be obtained without bodily cutting away the thickness until it is reached the difficulty of drilling even a small hole completely through into the interior is enormously increased. Even assuming penetration to be successfully accomplished, however, so that an explosive can be introduced, the safe will resist anything short of an enormous and practically prohibitory charge, the individual elements themselves having a very high resisting power, being so massive as not to be easily displaced through their mere weight, and the means employed for combining them being such that each interlocking element possesses per unit of area practically the maximum strength of the element which it secures, the ultimate interlocking element or elements being sustained in position by internally-disposed locking members.

We will now proceed to describe a typical embodiment of our invention by reference to the drawings.

Wherever the conditions of size and the surrounding inclosure or building permit such construction the top, bottom, sides, and ends of the safe are each constructed of a single massive slab, preferably of armor-plate, Harveyized both on its interior and exterior surfaces, and forged, as far as the same may be possible, to its ultimate shape.

In Figs. 1 to 5, both inclusive, A represents the bottom slab; B $b$, the end slabs; C $c$, the side slabs, and D the top slab.

The bottom slab A is formed with grooves A' (see Figs. 2 and 3) in its upper face running parallel with the sides, but terminating short of the extreme ends of the plate. The cross-section of these grooves may be square, as indicated, and the distance from the outer wall of the groove to the outside face of the bottom slab A should be equal to the width and depth of the groove itself, the intention being, in this method of construction, that the groove should be just half the width of the intended side slab C or $c$. Grooves $a'$, parallel to the ends, are also formed in the upper face of the slab A, said grooves merging into the side grooves A' and being of the same depth.

The cross-section of the end grooves $a'$ is substantially rhomboidal, both the inner and outer walls thereof being inclined and the outer wall being undercut, so as to permit the formation of a dovetail joint with the entering member of the end slabs. The distance from the top of the outer wall of each groove $a'$ to the extreme outer edge of the end of the bottom slab A and the inclination of said wall are such that the two members of the dovetail are of equal cross-section and have the same relation to the thickness of the respective slabs. The depth of the end grooves $a'$ is the same as that of the side grooves A', so that the bottom surface of the entire rectangular groove is substantially flush, but the width of the end grooves $a'$ exceeds that of the side grooves A', and by reason of the inward inclination of said inner wall a trapezoidal space is afforded for a locking member $a^3$, which will be hereinafter adverted to. Thus a continuous rectangular groove is formed in the upper surface of the bottom slab A running parallel to the sides and ends of said slab, the bottom of the groove being flush throughout and the walls of the side grooves being vertical, while those of the ends are inclined, the outer walls of the end grooves being undercut and the inner walls substantially parallel thereto.

The end slabs B and $b$ are similar to one another, except that one of them may contain a door E, which may be of any desired construction, and since it forms no part of the present invention may be disregarded. In the general description, owing to the similarity of detail, only one end slab $b$ will be completely described.

On the inner face of the slab $b$ vertical grooves $b'$ are formed adjacent to the sides and extending in depth substantially half the thickness of the slab. These grooves are trapezoidal in cross-section, the outer wall of the slab being undercut, as indicated at $b^2$, so as to afford a dovetail joint with a corresponding member of the side slab to be described hereinafter, the dovetail being characterized by the same relation to the thickness of the slabs as in the previous instance. Horizontal shoulders $b^3$ $b^4$, respectively, are formed on the exterior of the slab $b$ near the top and bottom thereof, said shoulders being prolonged around the corners at each end, so as to cut off the outer walls of the grooves $b'$ both at top and bottom. The depth of these shoulders is substantially one-half the thickness of the end slab $b$ along that portion of the outer face which corresponds with the distance between the extreme outer limits of the grooves $b^2$, but beyond said limits (by reason of the prolongation of the shoulders around the corners) the depth of the shoulders is equal to the total thickness of the slab $b$. The effect of the bottom shoulder is to leave a projecting flange $b^5$ at the bottom, and the outer face of this flange is inclined outwardly, as indicated at $b^6$, so as to interlock with the correspondingly undercut wall $a^2$ of the groove $a'$ in the bottom slab. A projecting flange $b^7$ is also formed by the shoulder $b^3$ near the top of the slab $b$, but the outer face of this flange is vertical, while the inner face $b^9$ is undercut or inclined, the inclination being prolonged downward, so that the total vertical extent of the undercut face is twice the height of the outer face of the flange $b^7$. As the result of this prolonged undercutting a shoulder $b^{10}$ is formed on the inner face of the slab.

Corresponding capital letters with similar numerals indicate similar details upon the other end slab B.

It will be seen that inasmuch as the end grooves $a'$ in the bottom slab A are wider than the flange $b^5$ of the end slab the end slab can be lowered until its flange $b^5$ rests upon the bottom of said groove, and then by means of the wedge-piece $a^3$ can be forced outwardly until the dovetailed face $b^6$ interlocks with the correspondingly-inclined dovetailed wall $a^2$ of the groove. Thus so long as the wedge-strip $a^3$ remains in position the end slab cannot be lifted away from the bottom slab.

The side slabs will now be described, and as they are also similar to one another only one thereof will be described in detail.

Along each end of the slab $c$ a vertical shoulder $c'$ is formed, the depth of said shoulder corresponding to the distance between the outer face of the end slab and the outer wall of the groove $b'$. The projecting flanges $c^2$, formed by the shoulders upon the side $c$, are undercut upon the outer face, as indicated at $c^3$, thus forming dovetail flanges which fit snugly within the vertical dovetailed grooves $b'$ and $B'$ of the end slabs $b$ and B. A horizontal shoulder $c^4$ is formed along the outer face of the side slab $c$, near the bottom thereof, thus leaving a projecting flange $c^5$ of rectangular cross-section and of the same dimensions as the side groove $A'$ of the bottom slab. A similar horizontal shoulder $c^6$ is formed along the outer face of the side slab $c$, near the top thereof, leaving an upwardly-projecting flange $c^7$. The width of said shoulder and the height of said flange are each equal substantially to one-half the thickness of the side wall, but the inner face of the flange is undercut, as indicated at $c^8$, the inclination being prolonged downward to double the height of the flange and terminating at a horizontal shoulder $c^9$. The corresponding members upon the other side slab C are designated by corresponding capital letters with similar numerals. The sides can thus be lowered into position after the end slabs have been placed in their respective positions, since the dovetailed flanges which run along the ends of each side slab will slide vertically into the dovetailed grooves of the end slabs, and as the bottom flange of each side slab is rectangular in cross-section it is admitted into and fits snugly within the corresponding side groove $A'$ of the bottom slab.

The structure thus formed now only lacks the top, but before proceeding to describe the same it will be noted that as thus far put together every part, excepting the side slabs, is interlocked, so as to be incapable of movement in any direction unless the dovetailed joints be actually broken. The side slabs themselves are incapable of any movement except a vertical one.

The top slab D is similar in form to the bottom one, and has a continuous rectangular groove formed in its under surface by end grooves $d'$ and side grooves $D'$, running parallel, respectively, to the ends and sides. The cross-section of each of said grooves, however, is trapezoidal, and while the thickness of the outer walls $D^2$ of the side and $d^2$ of the end grooves corresponds to the width of the shoulders $b^3$ $B^3$ upon the end slabs and $c^6$ $C^6$ upon the side slabs the width of the grooves $d'$ and $D'$ considerably exceeds the width of the flanges $b^7$ $B^7$ and $c^7$ $C^7$, formed at the top of the side and end slabs, so as to permit the entrance of the interior locking member $d^3$ along the ends and $D^3$ along the sides. Said locking members consist of strips of rhomboidal cross-section, the width of the strip being equal to the total depth of the groove and the thickness of the strip being just sufficient to completely fill the interspace between the inner walls of the grooves and the inner undercut faces of the flanges upon the side and end slabs. The insertion of these locking members is permitted by reason of the fact that the inclined walls $c^8$ $C^8$ $b^9$ $B^9$ upon the inner face of the sides and ends is prolonged downward to a distance equal to twice the depth of the grooves themselves, so that the end strips $d^3$ can be inserted by placing them in sidewise to rest upon the shoulders $b^{10}$ and then pushing them upward until they have completely filled the interspaces of the end grooves in the top slab and are consequently flush with the under surface thereof. A similar method of insertion is pursued with the side strips $D^3$, which are placed upon the shoulders $c^9$ and then pushed upward until they completely fill the interspaces of the side grooves in the top slab. It will be observed that so long as these locking-strips $d^3$ $D^3$ remain in position the top slab is completely interlocked with both the end and the side slabs, and thus incidentally the side slabs are locked against even vertical movement, since they cannot be lifted off without the destruction of the dovetailed joint between the top and end slabs, nor can it be lifted off independently of the sides and ends without the destruction of the entire dovetailed joints therewith. A complete interlocking structure is therefore presented.

To retain the locking members in position, we provide an interior framework, which is shown isolated in Fig. 6, the various parts being, however, represented in cross-section in Figs. 3, 4, and 5. Said framework consists of angle-bars F F' $f f'$, which constitute the bottom frame, G G' $g g'$, which constitute the uprights, and H H' $h h'$, which constitute the top frame. They may be beveled at the corners, as shown, so as to be capable of being fitted together from the interior of the vault after the slabs and their locking-pieces are placed in position, and are preferably continuous, as shown, with the exception of one piece, such as $h'$, which, if the last to be inserted, should be sectional, in order to permit the parts to be placed in position. We have indicated the middle portion thereof, $h^2$, as adapted to be inserted after the beveled end portions of the bar have been placed in position.

It may be bolted or otherwise secured. The selection of this particular bar is of course arbitrary, and, in fact, while the construction of the bars in the manner indicated, so as to fit completely together by means of bevels throughout, is theoretically correct we do not consider it of great practical importance, since the only function of these bars is to retain the locking members in position, and this may be accomplished with less elaboration of the framework than we have shown. As the interior is practically inaccessible, it is obvious that comparatively light retaining devices will suffice to hold the locking members $a^3$ at the bottom against upward displacement and the locking members $d^3$ $D^3$ from dropping or being forced downward. Whether such displacement be prevented by a continuous inner framework or by other devices adapted to serve the same purpose, it will be seen that the vault thus constructed is practically an integral structure, and that while bolts or other securing devices may be employed as adjuncts in connection with the several elements, they are not essential to the integrity of the structure as a whole. Complete interlocking of the several elements or units by members which are of such extent as that each pair possesses a united strength equivalent to the total strength of the elements themselves prevents the separation of any two elements by a less force than is required to destroy substantially the whole element, and the disposal of the material in elements which are individually massive presents the maximum resistance to attack, since, unlike walls which are constructed by the application of layers or built up of numerous blocks, penetration cannot be attained by a series of similar attacks upon individual members, but each element may be said to present the total resistance of the whole structure.

It is proper, of course, to recognize the fact that in the construction of very large vaults the formation of each of the described elements in an absolutely single mass may not be practicable within reasonable limits, and hence we contemplate the formation of an element or unit in sections; but the underlying principle of construction, to which our invention will then still adhere, is the preservation of a distinctly large mass for each section. Thus in Fig. 7 we have illustrated such a sectional element, (without the details of the locking parts,) the slab being formed in two sections L L′, which fit together by means of properly-flanged adjacent faces $l$ $l'$, which interlock and are duly seamed together.

To exactly define the term "massive" as applied to the individual elements is of course difficult, for obviously at some point a reduction in the size of the sections will result in a structure whose elements would possess no greater resisting power than is afforded by old and well-known types of block or layer construction. Adherence to the principle which we have endeavored to express will, however, point out the practical guide to construction and also the practical meaning of our claims, it being of the essence of the invention that the elements should be so massive as not to be bodily removable by anything short of machinery, as distinguished from hand labor or united human efforts. Such machinery is obviously applicable in constructing the safe, but obviously not within the practical range of possible unlawful attack.

We disclaim as old the use of blocks, broadly considered, and we disclaim as old the use of dovetails, broadly considered, as a method of uniting structural elements. On the other hand, we do not restrict ourselves to the particular and specific details whereby the interlocking of the several members is effected, it being only essential that those of the interlocking members which are the ultimate or final ones in the process of erection of the structure, and therefore in themselves independently disposable, shall be secured in position by locking members applied from within.

We use the term "safe" in a sense broad enough to include a vault or other strong chamber. We call attention to the fact that the application of the terms "end" and "side" to the slabs respectively thus designated is in a certain sense arbitrary, since the details of construction of the flanges and grooves set forth, and particularly referred to in the third claim hereof, may be transposed, and hence we do not wish to be understood as limiting ourselves, by the employment of the aforesaid terms, to the exact arrangement shown.

We claim—

1. As an improvement in safe construction, the combination of substantially integral and massive top and bottom, side and end elements of steel armor-plate; and interlocking flanges and grooves at the lines of junction of said elements, certain of the grooves being undercut and of greater width than the correspondingly-shaped flanges, and locking members within the safe in the spaces thus formed and firmly locking said top, bottom, ends and sides together against separation in any direction, the combined strength of the pairs of flanges being not substantially less than the total strength of the individual elements, whereby a practically integral structure is obtained, substantially as set forth.

2. As an improvement in safe construction, the combination of substantially integral and massive top and bottom, side and end elements of steel armor-plate; interlocking flanges and grooves at the lines of junction of said elements, certain of the grooves being undercut and of greater width than the correspondingly-shaped flanges whereby locking-spaces are formed within the safes, the combined strength of the pairs of flanges being not substantially less than the total strength of the elements themselves; locking members or strips in the said locking-spaces whereby lateral separation of adjacent flanges is prevented; and interior retaining devices adapted to hold said locking members in position, substantially as set forth.

3. The combination of the bottom slab, having side grooves of rectangular cross-section and undercut end grooves; the end slabs, having projecting bottom flanges conforming to the undercut faces of the end grooves, and having top flanges with internally overhanging faces, and side grooves of rhomboidal cross-section; the side slabs, having bottom flanges of rectangular cross-section, top flanges with inwardly overhanging faces and end flanges conforming to the trapezoidal grooves of the end slabs; the top slab having grooves of trapezoidal cross-section parallel to each edge, each of said slabs being substantially integral and massive; the locking members or strips in said grooves adapted to prevent lateral displacement of the interlocked flanges at the bottom of the end slabs and the top of the end and side slabs; and the interior retaining devices adapted to hold said locking members in position, substantially as set forth.

WILLIAM H. HOLLAR.
ANTHONY KENNEDY.

Witnesses:
JAMES H. BELL,
G. HERBERT JENKINS.